(12) United States Patent
Kang et al.

(10) Patent No.: US 7,400,898 B2
(45) Date of Patent: Jul. 15, 2008

(54) METHOD FOR OPERATION OF HARQ IN A BROADBAND WIRELESS ACCESS COMMUNICATION SYSTEM

(75) Inventors: Hyon-Goo Kang, Suwon-si (KR);
Seung-Eun Hong, Suwon-si (KR);
Yeong-Moon Son, Anyang-si (KR);
Geun-Hwi Lim, Seongnam-si (KR);
So-Hyun Kim, Suwon-si (KR);
Chang-Hoi Koo, Seongnam-si (KR);
Jae-Jeong Shim, Seoul (KR);
Jung-Won Kim, Seoul (KR); Jung-Shin Park, Seoul (KR); Jung-Je Son, Seongnam-si (KR); Hong-Sung Chang, Suwon-si (KR)

(73) Assignee: Samsung Electronics CO., LTD (KR)

( * ) Notice: Subject to any disclaimer, the term of this patent is extended or adjusted under 35 U.S.C. 154(b) by 458 days.

(21) Appl. No.: 11/080,166

(22) Filed: Mar. 14, 2005

(65) Prior Publication Data
US 2005/0201325 A1 Sep. 15, 2005

(30) Foreign Application Priority Data
Mar. 12, 2004 (KR) ...................... 10-2004-0017075

(51) Int. Cl.
*H04B 1/38* (2006.01)
*H04M 1/00* (2006.01)
(52) U.S. Cl. ........................ 455/518; 455/522; 370/208
(58) Field of Classification Search ................ 370/328, 370/208; 455/518, 522
See application file for complete search history.

(56) References Cited

U.S. PATENT DOCUMENTS

2004/0179469 A1* 9/2004 Attar et al. .................. 370/208
2006/0003784 A1* 1/2006 Chion et al. ................ 455/518

FOREIGN PATENT DOCUMENTS

EP 1 389 847 2/2004
WO WO 00/39168 7/2000

OTHER PUBLICATIONS

Eklund et al: IEEE Standard 802.16: A Technical Overview of the Wireless Air Interface for Broadband Wireless Access, IEEE Communications Magazine, vol. 40, No. 6, Jun. 2002.
802.16a Part 16: Air Interface for Fixed Broadband Wireless Access Systems - Amendment 2: Medium Access Control Modifications and Additional Physical Layer Specifications for 2-11 Ghz, IEEE Computer Society, Apr. 2003.

* cited by examiner

*Primary Examiner*—William D. Cumming
(74) *Attorney, Agent, or Firm*—The Farrell Law Firm, PC

(57) ABSTRACT

Provided is a method supporting a Hybrid Automatic Repeat Request (HARQ) between a subscriber station and a base station in a broadband wireless access communication system. The method includes transmitting at least one HARQ enabled uplink burst from the subscriber station to the base station; generating ACKnowledgment/Negative ACKnowledgment (ACK/NACK) information according to the received HARQ enabled uplink burst at the base station; mapping the generated ACK/NACK information to a bitmap at the base station; and transmitting the bitmap through a downlink information from the base station to the subscriber station.

30 Claims, 5 Drawing Sheets

METHOD FOR OPERATION OF HARQ IN A BROADBAND WIRELESS ACCESS COMMUNICATION SYSTEM

PRIORITY

This application claims priority to an application entitled "Method for Operation of HARQ in Broadband Wireless Access Communication System" filed in the Korean Industrial Property Office on Mar. 12, 2004, and assigned Serial No. 2004-17075, the contents of which are hereby incorporated by reference.

BACKGROUND OF THE INVENTION

1. Field of the Invention

The present invention relates generally to a method for operating a Hybrid Automatic Repeat Request (HARQ) scheme in a broadband wireless access communication system and, more particularly, to a method for operating an uplink/downlink transmit response for effective utilization of a HARQ scheme.

2. Description of the Related Art

In a $4^{th}$ generation (4G) communication system, which is the next generation communication system, research has been actively pursued to provide users with services having various qualities of service (QoS) at a high transmission speed of 100 Mbps. The current third generation (3G) communication system supports a transmit speed of about 384 kbps in an outdoor environment having relatively bad channel conditions and a transmit speed of a maximal 2 Mbps in an indoor environment having relatively good channel conditions A wireless Local Area Network (LAN) communication system and a wireless Metropolitan Area Network (MAN) communication system generally support transmission speeds of 20 to 50 Mbps. Because the wireless MAN communication system has wide service coverage and supports a high transmission speed, it is suitable for supporting a high speed communication service. However, the wireless MAN system does not accommodate the mobility of a user, i.e., a subscriber station (SS), nor does it perform a handover according to the high speed movement of the SS. The wireless MAN system is a broadband wireless access communication system having a wider service area and supporting a higher transmission speed than the wireless LAN system.

Accordingly, in a current 4G communication system, a new type of communication system ensuring mobility and QoS for the wireless LAN system and the wireless MAN system supporting relatively high transmission speeds is currently being developed to support a high speed service to be provided by the 4G communication system. In this context, many studies are being conducted on using an Orthogonal Frequency Division Multiplexing (OFDM) scheme for high-speed data transmission over wired/wireless channels in the 4G mobile communication system. The OFDM scheme, which transmits data using multiple carriers, is a special type of a Multiple Carrier Modulation (MCM) scheme in which a serial symbol sequence is converted into parallel symbol sequences and the parallel symbol sequences are modulated with a plurality of mutually orthogonal subcarriers (or subcarrier channels) before being transmitted.

The Orthogonal Frequency Division Multiple Access (OFDMA) scheme is a Multiple Access scheme based on the OFDM scheme. In the OFDMA scheme, subcarriers in one OFDM symbol are distributed to a plurality of users (or SSs). Communication systems using the OFDMA scheme include an Institute of Electrical and Electronics Engineers (IEEE) 802.16a communication system and an IEEE 802.16e communication system. The IEEE 802.16 communication systems utilize the OFDM/OFDMA scheme in order to support a broadband transmit network for a physical channel of the wireless MAN system. Further, the IEEE 802.16 communication systems are broadband wireless access communication systems using a Time Division Duplex (TDD)-OFDMA scheme. Therefore, in the IEEE 802.16 communication systems, because the OFDM/OFDMA scheme is applied to the wireless MAN system, a physical channel signal can be transmitted using a plurality of sub-carriers, thereby achieving data transmission of high speed and high quality.

The OFDMA scheme can be defined by a two-dimensional access scheme, which is a combination of the Time Division Access (TDA) technology and Frequency Division Access (FDA) technology. Therefore, in data transmission using the OFDMA scheme, each OFDMA symbol is distributed to sub-carriers and transmitted through predetermined sub-channels. Herein, the sub-channel is a channel including a plurality of sub-carriers. In a communication system using the OFDMA scheme (OFDMA communication system), predetermined number of sub-carriers according to system conditions are included in one sub-channel.

FIG. 1 schematically illustrates a frame structure of a conventional TDD-OFDMA communication system. Referring to FIG. 1, the frame used in the TDD-OFDMA communication system is divided between downlink (DL) 149 and uplink (UL) 153, according to the time unit. In the frame, a protection time interval named 'Transmit/receive Transition Gap (TTG) 151' is arranged at a time interval for transition from the downlink 149 to the uplink 153 and a protection time interval named 'Receive/transmit Transition Gap (RTG) 155' is arranged at a time interval for transition from the uplink 153 to the next downlink. In FIG. 1, the horizontal axis represents the OFDM symbol number 145 of the OFDMA symbols and the vertical axis represents the sub-channel logical number 147 of the multiple sub-channels.

As illustrated in FIG. 1, one OFDMA frame includes a plurality of OFDMA symbols (for example, 12 OFDMA symbols). Also, one OFDMA symbol includes a plurality of sub-channels (for example, L sub-channels).

In the IEEE 802.16 communication system described above, all sub-carriers (especially, data sub-carriers) are distributed to all frequency bands, in order to obtain the frequency diversity gain. Further, in the IEEE 802.16 communication system, during the transmit/receive time interval, ranging is performed in order to adjust time offset and frequency offset, and adjust the transmit power.

Referring to the downlink 149, a preamble 111 for synch acquisition is located at the k-th OFDMA symbol, and broadcast data information such as a Frame Control Header (FCH)

113, a downlink MAP (DL-MAP) 115, and an uplink MAP (UL-MAP) 117, which must be broadcast to the subscriber stations, is located at the (k+1)-th or (k+2)-th OFDMA symbol. The FCH 113 includes two sub-channels to transfer basic information about the sub-channel, the ranging and the modulation scheme, etc. Downlink bursts (DL bursts) 121, 123, 125, 127, and 129 are located at the OFDMA symbols from the (k+2)-th OFDMA symbol to the (k+8)-th OFDMA symbol, except for the UL-MAP located at the (k+2)-th OFDMA symbol.

Referring to the uplink 153, preambles 131, 133, and 135 are located at the (k+9)-th OFDMA symbol and uplink bursts (UL bursts) 137, 139, and 141 are located at the OFDMA symbols from the (k+10)-th OFDMA symbol to the (k+12)-th OFDMA symbol. Further, a ranging sub-channel 143 is located at the OFDMA symbols from the (k+9)-th OFDMA symbol to the (k+12)-th OFDMA symbol.

In the IEEE 802.16 communication system, the transition from the downlink to the uplink is performed during the TTG 151. Further, the transition from the uplink to the downlink is performed during the RTG 155. Further, after the TTG 151 and the RTG 155, separate preamble fields 111, 131, 133, and 135 may be allocated to acquire synch between the transmitter and the receiver.

According to the frame structure of the IEEE 802.16 communication system, the downlink frame 149 includes a preamble field 111, an FCH field 113, a DL-MAP field 115, UL-MAP fields 117 and 119, and a plurality of DL burst fields (including a DL burst #1 field 123, a DL burst #2 field 125, a DL burst #3 field 121, a DL burst #4 field 127, and a DL burst #5 field 129).

The preamble field 111 is a field for transmitting a preamble sequence, which is a synch signal for synch acquisition for the transmit/receive time interval. Further, the FCH field 113 includes two sub-channels to transfer basic information about the sub-channel, the ranging and modulation scheme, etc. The DL-MAP field 115 is a field for transmitting the DL-MAP message. The UL-MAP fields 117 and 119 are fields for transmitting the UL-MAP messages. Here, the DL-MAP message includes Information Elements (IEs) as shown in Table 1 below.

TABLE 1

| Syntax | Size | Notes |
| --- | --- | --- |
| DL-MAP_IE( ) { | | |
|   DIUC | 4 bits | |
|   if(DIUC==15) { | | |
|     Extended DIUC dependent IE | variable | See 802.16a/16e OFDMA PHY Specifications |
|   } else { | | |
|     if(INC_CID==1) { | | The DL-MAP starts with INC_CID = 0. INC_CID is toggled between 0 and 1 by the CID_SWITCH_IE ( ) (See 802.16a/16e OFDMA PHY Specifications) |
|       N_CID | 8 bits | Number of CIDs assigned for this IE |
|       for(n=0;n<N_CID;n++) { | | |
|         CID | 16 bits | |
|       } | | |
|     } | | |
|     OFDMA Symbol Offset | 10 bits | |
|     Subchannel Offset | 5 bits | |
|     Boosting | 3 bits | 000: normal (not boosted) |
| | | 001: +6 dB |
| | | 010: −6 dB |
| | | 011: +9 dB |
| | | 100: +3 dB |
| | | 101: −3 dB |
| | | 110: −9 dB |
| | | 111: −12 dB |
|     No. OFDMA Symbols | 9 bits | |
|     No. Subchannels | 5 bits | |
|   } | | |
| } | | |

As shown in Table 1, a DIUC (Downlink Interval Usage Code) represents the object of a currently transmitted message and the modulation scheme in which the currently transmitted message is modulated before being transmitted. A CID (connection Identifier) represents the CID of each subscriber station corresponding to the DIUC.

OFDMA Symbol Offset represents the offset of a symbol resource allocated to each DL burst. Subchannel Offset represents the offset of a sub-channel resource allocated to each DL burst. Boosting represents a power value increased in the transmit power. 'No. OFDMA Symbols' represents the number of allocated OFDMA symbols. 'No. Subchannels' represents the number of allocated sub-channels.

As noted from Table 1, the downlink information of the IEEE 802.16 communication system is expressed in combination with information about each subscriber station according to the DIUC. Therefore, each subscriber station can analyze the data targeting the subscriber station itself, only after demodulating the entire DL-MAP message.

The UL-MAP message includes Information Elements (IEs) as shown in Table 2 below.

TABLE 2

| Syntex | Size | Notes |
|---|---|---|
| UL-MAP_IE( ) { | | |
|    CID | 16 bits | |
|    UIUC | 4 bits | |
|    if(UIUC==12) { | | |
|       OFDMA Symbol Offset | 10 bits | |
|       Subchannel Offset | 6 bits | |
|       No. OFDMA Symbols | 8 bits | |
|       No. Subchannels | 5 bits | |
|       Ranging Method | 3 bits | 000: Initial Ranging over two symbols<br>001: Initial Ranging over four symbols<br>010: BW Request/Periodic Ranging over one sysbol<br>011: BW Request/Periodic Ranging over three symbols<br>100~111: reserved |
|    } else if(UIUC==14) { | | |
|       CDMA_Allocation_IE ( ) | 52 bits | |
|    } else if(DIUC==15) { | | |
|       Extended DIUC dependent IE | variable | See 802.16a/16e OFDMA PHY Specifications |
|    } else { | | |
|       OFDMA Symbol Offset | 10 bits | |
|       Subchannel Offset | 5 bits | |
|       No. OFDMA Symbols | 9 bits | |
|       No. Subchannels | 5 bits | |
|       Mini-subchannel index | 3 bits | 000: no mini-subchannels used<br>001: starting with mini-subchannel 1<br>010: starting with mini-subchannel 2<br>011: starting with mini-subchannel 3<br>100: starting with mini-subchannel 4<br>101: starting with mini-subchannel 5<br>110, 111: reserved |
|    } | | |
| } | | |

As shown in Table 2, a CID (connection Identifier) represents the CID of each corresponding subscriber station and an UIUC (Uplink Interval Usage Code) represents the object of the message to be transmitted by the corresponding subscriber station and the modulation scheme in which the message is modulated before being transmitted. The other information elements are similar to those in Table 1, so description of them will be omitted here.

According to the frame structure of the IEEE 802.16 communication system as described above, the uplink frame 153 includes a ranging sub-channel field 143, a plurality of preamble fields 131, 133, and 135, and a plurality of UL burst fields (a UL burst #1 field 137, a UL burst #2 field 139, and a UL burst #3 field 141).

The ranging sub-channel field 143 is a field for transmitting ranging sub-channels for the ranging, and the preamble fields 131, 133, and 135 are fields for transmitting preamble sequences, i.e. synch signals for synch acquisition for the transmit/receive time interval.

According to the prior art as described above, each subscriber station (SS) cannot be identified by the bursts transmitted from the base station (BS) to the SS but can be identified by the bursts transmitted from the SS to the BS. Accordingly, the prior art described above is not proper for use of a Hybrid Automatic Repeat Request (HARQ) scheme in order to increase the transmission throughput when high speed transmission is required in a digital communication system. Therefore, in the prior art, transmission efficiency may be degraded due to errors in the wireless data transmission.

Further, the IEs, as described above, must be transmitted to all SSs through the MAP message by the most robust modulation scheme, such that they can be delivered to an entire cell area covered by the BS. However, as noted from the above discussion, the IEs are inefficiently included in the MAP message, that is, control data of an over burdensome size in the high speed data transmission system must be maintained. Such inefficient control data decreases the proportion of the actual data traffic in the entire traffic.

SUMMARY OF THE INVENTION

Accordingly, the present invention has been designed to solve the above and other problems occurring in the prior art. An object of the present invention is to provide a method for operating an uplink/downlink transmission response for efficient utilization of the HARQ scheme in a broadband wireless access communication system.

It is another object of the present invention to provide an operation method of an ACK channel for supporting HARQ, transmitting a downlink HARQ enabled burst result report field through an uplink map, and transmitting an uplink HARQ enabled burst result in the form of bitmap.

In order to accomplish the above and other objects, there is provided a method supporting a Hybrid Automatic Repeat Request (HARQ) between a subscriber station and a base station in a broadband wireless access communication system including. The method comprises the steps of transmitting at least one HARQ enabled uplink burst from the subscriber station to the base station; generating ACK or NACK information according to the received HARQ enabled uplink burst at the base station; mapping the generated ACK or NACK information to a bitmap at the base station; transmitting the bitmap through a downlink information from the base station to the subscriber station.

In accordance with another aspect of the present invention, there is provided a method supporting a Hybrid Automatic Repeat Request (HARQ) between a subscriber station and a base station in a broadband wireless access communication system including. The method comprises the steps of: generating a downlink information indicating a HARQ ACK region and at least one HARQ enabled downlink burst at the base station; transmitting the downlink information from the base station to the subscriber station; generating ACK or NACK information according to the received HARQ enabled downlink burst at the subscriber station; transmitting the generated ACK or NACK information through the HARQ ACK region from the subscriber station to the base station.

In accordance with another aspect of the present invention, there is provided a method for operating a Hybrid Automatic Repeat Request (HARQ) scheme for a downlink by a subscriber station in a broadband wireless access communication system including the subscriber station and a base station. The method comprises the steps of: determining the type of HARQ enabled downlink burst being transmitted by analyzing an information element corresponding to a connection identifier of the subscriber station, after receiving a downlink MAP message belonging to a corresponding frame; when the HARQ enabled downlink burst being transmitted is a new burst, confirming transmission of the new burst and information of the HARQ enabled downlink burst, and receiving the HARQ enabled downlink burst in a downlink data region; when the HARQ enabled downlink burst being transmitted is a retransmitted burst, confirming retransmission of an already transmitted burst and information of the HARQ enabled downlink burst, and receiving the HARQ enabled downlink burst in a downlink data region; determining if the received HARQ enabled downlink burst has an error; and transmitting one of an acknowledgement (ACK) message and a negative acknowledgement (NACK) message through a sub-channel in accordance with the determining for the error.

In accordance with another aspect of the present invention, there is provided a method for operating a Hybrid Automatic Repeat Request (HARQ) scheme for an uplink by a base station in a broadband wireless access communication system. The method comprises the steps of: determining at least one subscriber station to which a base station will transmit a HARQ enabled burst through a corresponding uplink frame; determining information of the HARQ enabled burst of the at least one subscriber station; determining a type of the HARQ enabled burst by analyzing an information element corresponding to the determined subscriber station; when the HARQ enabled burst being transmitted is a new burst, preparing an uplink MAP message to be transmitted to the subscriber station, preparing an information element corresponding to the uplink MAP message, and receiving the HARQ enabled burst targeting the base station in an uplink data region; when the HARQ enabled burst being transmitted is a retransmitted burst, preparing an Incremental Redundancy (IR) scheme, preparing the uplink MAP message to be transmitted to the subscriber station, preparing an information element corresponding to the uplink MAP message, and receiving the HARQ enabled burst targeting the base station in the uplink data region; determining if the received HARQ enabled burst has an error; preparing one of an ACK message and a NACK message in a form of bitmap, in accordance with a result of the determining; and transmitting the one of the ACK message and the NACK message.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description, a detailed description of known functions and configurations incorporated herein will be omitted when it may obscure the subject matter of the present invention.

The present invention proposes a new TDD-OFDMA frame structure for a TDD-OFDMA communication system (an OFDMA communication system using a TDD scheme). More specifically, the present invention proposes an uplink/downlink transmission control method, in which an ACK channel for supporting the HARQ scheme is newly constituted and an uplink HARQ enabled burst result is transmitted as a bitmap through an uplink map, so the method can efficiently use the HARQ scheme.

The method of the present invention reduces the size of the entire MAP because the ACK/NACK information is transmitted in the form of bitmap. Further, such reduction in the size of the entire MAP reduces the control data in a system intended to perform high speed data transmission (for example, the TDD-OFDMA communication system). Moreover, such a reduction can increase the proportion of the actual data traffic in the entire traffic, thereby improving transmission efficiency.

The present invention discloses a method for transmitting/receiving uplink/downlink data for high speed data transmission in a broadband wireless access system including an SS and a BS providing service to the SS. In the system according to the present invention, in high speed data transmission between the BS and the SS, control information for HARQ is carried through HARQ_Control IE in the burst information of each SS in the DL-MAP message and the UL-MAP message broadcast to each SS from the BS, and ACK/NACK information for the data which the BS has received from the SS is carried through HARQ_ACK_BITMAP IE in the UL-MAP of the BS.

Further, in the system according to the present invention, the channel through which the SS can transmit the ACK/NACK information for the data that the SS has received from the BS is determined according to an ACK/NACK information transfer scheme. Therefore, the present invention enables efficient use of the HARQ scheme, rapid and exact transmission of ACK/NACK for the uplink/downlink data, and an efficiency increase thereof.

Figure 1:
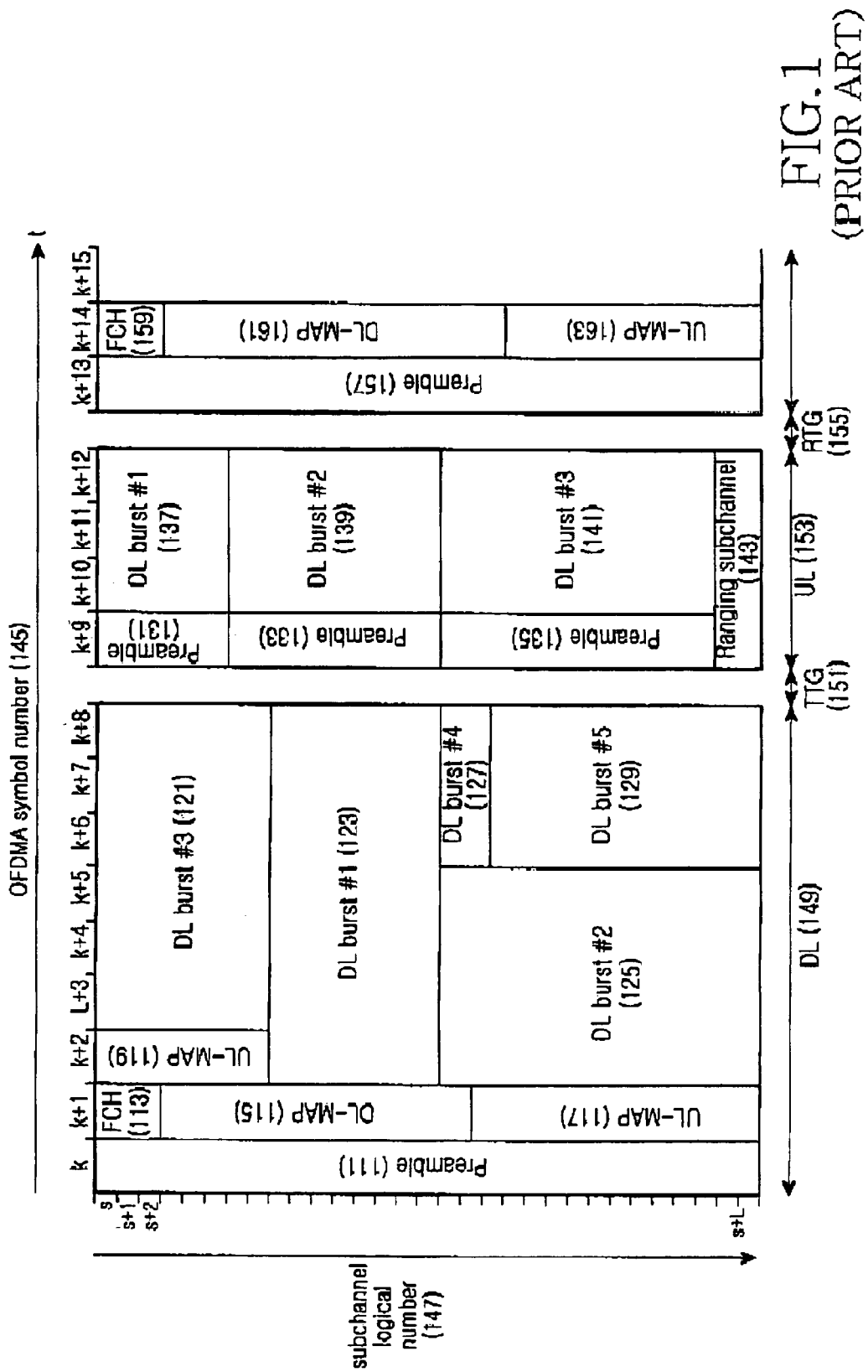
FIG. 1 schematically illustrates a frame structure of a conventional TDD-OFDMA communication system.
Figure 2:
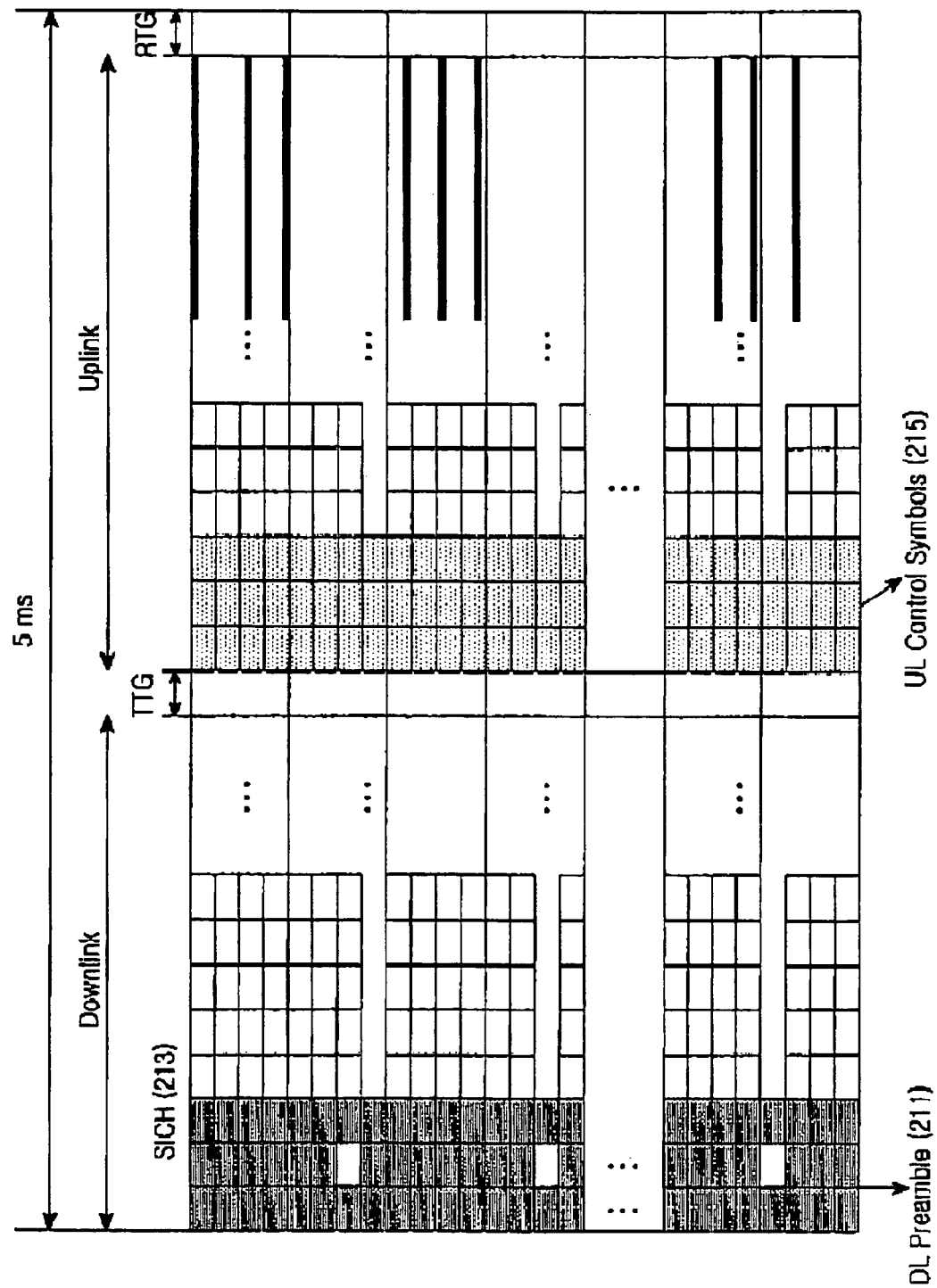
FIG. 2 schematically illustrates a frame structure including a dedicated uplink control channel of a TDD-OFDMA communication system according to the present invention.

FIG. 2 schematically illustrates a frame structure including a dedicated uplink control channel of a TDD-OFDMA communication system according to the present invention. The present invention proposes a new common control information channel, that is, a System Information Channel (SICH), in order to overcome the problems due to the transmission of the SS information in the form of messages such as the DL-MAP message and the UL-MAP message in the downlink frame in the conventional IEEE 802.16 communication system.

In FIG. 2, the horizontal axis represents the OFDMA symbol number and the vertical axis represents the sub-channel number. Further, one OFDMA frame includes a plurality of OFDMA symbols and one OFDMA symbol includes a plurality of sub-channels. Also, one sub-channel includes a plurality of sub-carriers distributed over all frequency bands.

Referring to FIG. 2, reference numeral 211 designates a downlink preamble (DL preamble), and the OFDMA frame structure does not include an uplink preamble. Reference numeral 213 designates the SICH to which the OFDMA symbol is exclusively allocated. The SICH contains system information such as the frame number, BS identifier (ID), etc.

Reference numeral 215 designates three OFDMA symbols exclusively allocated to an Uplink Control Channel (UCC), which includes a ranging channel, a Channel Quality Indicator Channel (CQI-CH) for reporting the wireless state, and an ACK channel for HARQ.

Further, the SICH includes an Uplink Control Channel Indicator (UCCI) representing if the MAP includes a UCC_Region IE containing region information of the UCC. As described above, the UCC region 215 of FIG. 2 includes three divided regions.

Table 3 shows the structure of the UCC_Region IE.

TABLE 3

| Syntax | Size | Notes |
| --- | --- | --- |
| UCC_Region_IE( ) { | | This IE exists only if UCCI bit is 1 |
|    Ranging Channel Region | 2 bits | |
|    HARQ ACK Channel Region | 6 bits | |
| } | | |

Referring Table 3, the UCC_Region IE includes a Ranging Channel Region representing the size of the ranging channel and a HARQ ACK Channel Region representing the size of the ACK channel for HARQ. The CQI-CH can be calculated from the size of the ranging channel and the size of the ACK channel. When the SS receives the information about the UCC region as described above, the SS can utilize the UCC region according to its object.

The HARQ function control is performed by a HARQ_Control IE among information elements of bursts allocated to each SS. Table 4 below shows the structure of the HARQ_Control IE.

TABLE 4

| Syntax | Size | Notes |
| --- | --- | --- |
| HARQ_Control_IE( ) { | | In DL/UL-MAP |
|    SPID | 2 bits | Subpacket ID |
|    ACID | 2 bits | ARQ Connection ID |
|    Continuation | 1 bit | |
| } | | |

Referring Table 4, it is noted that the HARQ_Control IE includes five bits in total. In Table 4, 'SPID' represents a sub-packet identifier, which is used to identify each sub-packet generated during application of the HARQ according to an Incremental Redundancy (IR) scheme. However, the characteristic and the operation of the IR scheme have been widely known to the public, so detailed description thereof will be omitted here.

In the TDD-OFDMA communication system, because the TDD-OFDMA communication system includes three sub-packets, the SPID can be expressed by two bits.

ACID represents a connection identifier used in order to effectively indicate transmission delay generated during the application of the HARQ. Usually, it is difficult to process without delay the ACK/NACK for the HARQ-applied data even in a system capable of transmitting data at high speed for both the uplink and the downlink. Therefore, it is difficult to regard an ACK/NACK carried by a specific frame as relating to the data having been transmitted by the specific frame, so such an identifier is necessary. In the TDD-OFDMA communication system, the ACID can be expressed by two bits, because the maximum delay of the ACK/NACK is considered as being about three frames.

'Continuation' is a field representing if a new HARQ enabled burst is being transmitted or an already transmitted HARQ enabled burst is being retransmitted. 'Continuation' is used to detect errors in the transmission of the ACK/NACK of the HARQ type, thereby improving the reliability.

Figure 3:
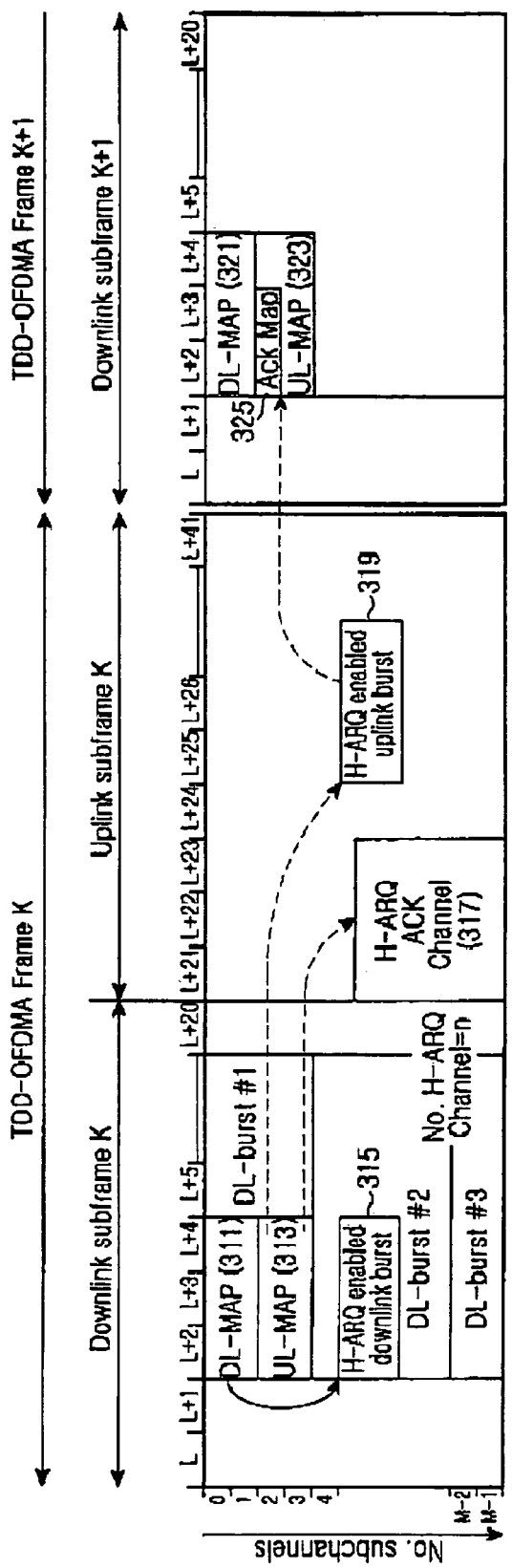
FIG. 3 is a view for illustrating a method for operation of HARQ ACK/NACK of a TDD-OFDMA communication system according to an embodiment of the present invention.

FIG. 3 illustrates a method for operation of HARQ ACK/NACK of a TDD-OFDMA communication system according to an embodiment of the present invention. Referring to FIG. 3, the DL-MAP 311 in the K-th frame expresses the location and the size of a HARQ enabled downlink burst 315 (a downlink burst transmitted at the K-th frame from the BS to the SS). Further, in transmitting the DL-MAP 311, control information of the HARQ enabled downlink burst is carried by the HARQ_Control IE as defined in Table 4.

The UL-MAP 313 in the K-th frame expresses the location and the size of an HARQ enabled uplink burst 319 (an uplink burst transmitted at the K-th frame from the SS to the BS). In transmitting the UL-MAP 313 also, control information of the transmitted HARQ enabled uplink burst is carried by the HARQ_Control IE as defined in Table 4.

In the UL-MAP 313, a channel for carrying the ACK/NACK information for the HARQ enabled downlink burst 315 transmitted at or before the K-th frame from the BS to the SS may be arranged in the UCC region 317.

In arranging the channel for carrying the ACK/NACK information, the number of HARQ enabled downlink bursts is counted, the ordinal number of the HARQ enabled downlink burst 315 is checked, a HARQ ACK channel is arranged and occupied in the UCC region 317, and the ACK/NACK information is then transmitted. For example, if the HARQ enabled downlink burst 315 is transmitted at the m-th time in the downlink data region, the ACK/NACK information for the HARQ enabled downlink burst 315 is transmitted through the m-th HARQ ACK channel.

The ACK/NACK information of the HARQ enabled uplink burst 319 transmitted from the SS to the BS is expressed as a bitmap (ACK MAP) 325 in the UL-MAP message 323 broadcast at the (K+1)-th frame or after the (K+1)-th frame to the SSs by the BS.

Further, information of the bit to which the ACK/NACK information for the SS corresponds in the bitmap 325 is controlled in the same way as the method of transmitting the downlink ACK/NACK information described above. That is, the number of HARQ enabled uplink bursts is counted, the ordinal number of the HARQ enabled uplink burst 319 is checked, one bit in the bitmap 325 of the UL-MAP message 323 is occupied, and the ACK/NACK information is then transmitted. For example, if the HARQ enabled uplink burst 319 is transmitted at the n-th time in the uplink data region, the ACK/NACK information for the HARQ enabled uplink burst 319 is transmitted through the n-th bit.

The IEs included in the bitmap 325 are shown in Table 5 below.

TABLE 5

| Syntax | Size | Notes |
| --- | --- | --- |
| HARQ_ACK_BITMAP_IE( ) { | | In UL-MAP |
| Length of ACK bitmap | 4 bits | 8 × (n + 1) bitmap, n = 0~15 |
| ACK bitmap | variable | The ACK bit-map field is a variable length field |
| } | | |

In Table 5, 'Length of ACK bitmap' represents the length of the HARQ ACK bitmap. 'ACK bitmap' expresses a variable length.

As described above, the HARQ_ACK_BITMAP IE is transmitted according to the most robust modulation scheme by the UL-MAP message broadcast from the BS to all SSs. Therefore, in order to achieve efficient transmission in a system including variable SSs, it is more efficient to use a bitmap having a variable length than to use a bitmap having a fixed length.

Further, by using the bitmap in transmitting the ACK/NACK information, the size of the entire MAP can be largely reduced as described above. Therefore, use of the bitmap can reduce the size of the control data in a high speed data transmission system such as the TDD-OFDMA communication system. That is, use of the bitmap can increase the proportion of the actual data traffic in the entire traffic, thereby improving the transmission efficiency.

Figure 4:
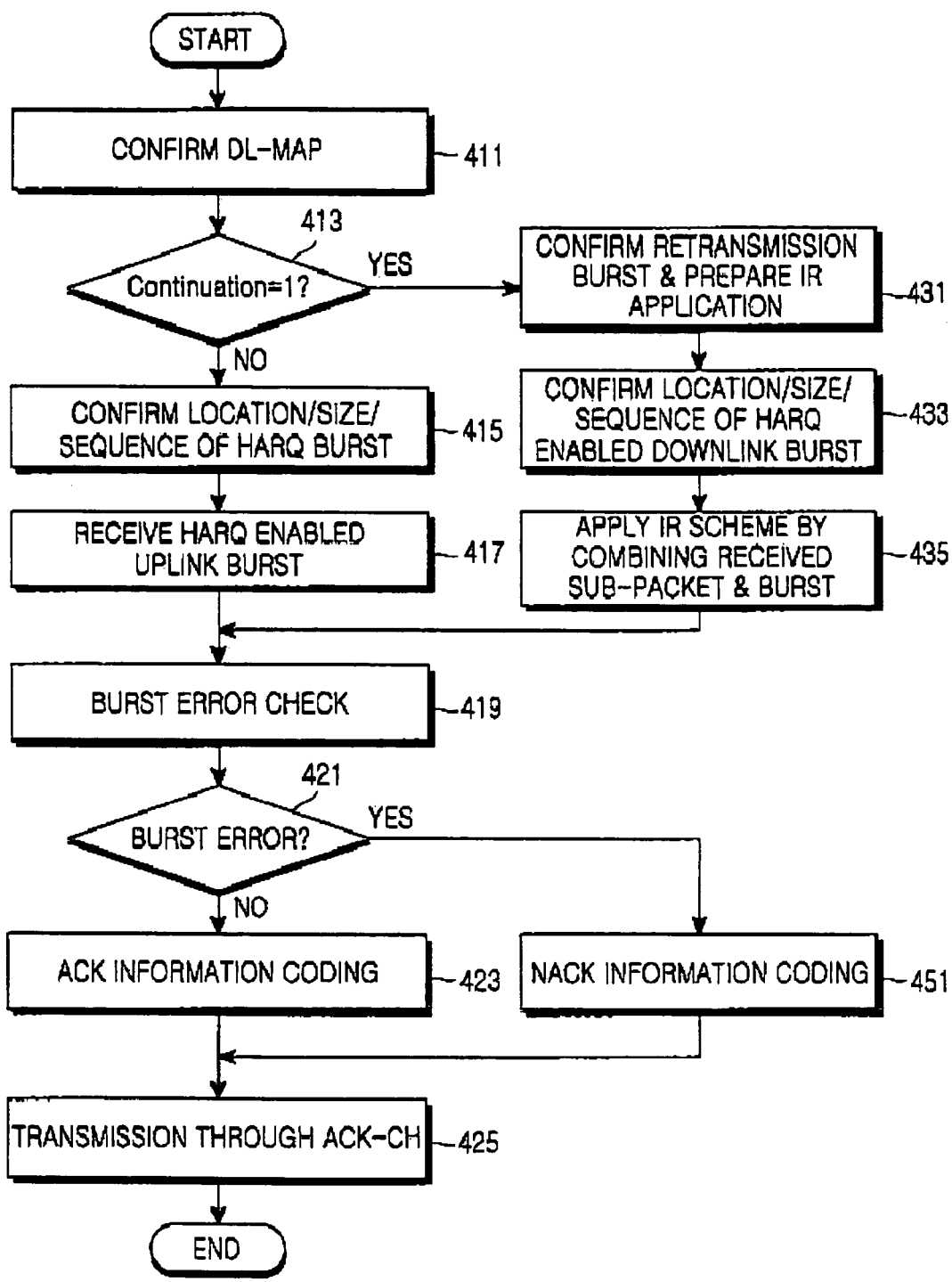
FIG. 4 is a flowchart of a process for operation of downlink HARQ in a HARQ ACK/NACK operation method according to the present invention.

FIG. 4 is a flowchart of a process for operation of a downlink HARQ in a HARQ ACK/NACK operation method according to the present invention. More specifically, FIG. 4 illustrates an operation of an SS for the downlink in a process of operating the HARQ ACK/NACK.

Referring to FIG. 4, the SS confirms the DL-MAP in the corresponding frame currently assigned to the SS and then analyzes the HARQ_Control IE corresponding to the CID of the SS in step 411. Based on the analysis of the HARQ_Control IE, the SS confirms the continuation field in the HARQ_Control IE in step 413. When the continuation field has a value of '0', the SS confirms that current transmission is transmission of a new HARQ enabled downlink burst and then checks information including the location, size, and sequence of the HARQ enabled downlink burst in step 415.

After checking the HARQ enabled downlink burst information, the SS receives the HARQ enabled downlink burst forwarded to the SS in a downlink data region in step 417. The SS checks whether the received HARQ enabled downlink burst has an error in steps 419 and 421.

When the HARQ enabled downlink burst has no error the SS codes the ACK information in step 423. However, when the HARQ enabled downlink burst has an error the SS codes the NACK information in step 451.

After coding the ACK or NACK information, the SS transmits the coded signal through the sub-channel (ACK-CH) allocated to the SS in the uplink UCC region of the frame in step 425.

As a result of the confirmation of the continuation field in the HARQ_Control IE in step 413, when the continuation field has a value of '1', the SS confirms that current transmission is a retransmission of an already transmitted HARQ enabled downlink burst and then prepares the Incremental Redundancy (IR) scheme in step 431. After preparing the IR scheme, the SS confirms information including the location, size, and sequence of the HARQ enabled downlink burst in step 433. Thereafter, the SS receives the HARQ enabled downlink burst targeting the SS itself and applies the IR scheme by combining the already received sub-packet and the burst in step 435.

Hereinafter, an operation of the SS for the downlink in the HARQ ACK/NACK operation process of the TDD-OFDMA communication system having the above-described construction will be described.

In step 411, the SS confirms the DL-MAP in the corresponding frame and then analyzes the HARQ_Control IE corresponding to the CID of the SS. In step 413, the SS refers to the value of the continuation field in the HARQ_Control IE and determines if the current transmission is transmission of a new HARQ enabled downlink burst or retransmission of an already transmitted HARQ enabled downlink burst. The continuation field is (shown in Table 4) used for determining if the current transmission is transmission of a new HARQ enabled downlink burst or retransmission of an already transmitted HARQ enabled downlink burst, and is used in order to detect an error in the ACK/NACK transmission of the HARQ scheme, thereby improving the reliability.

When the continuation field has a value of '0', that is, when the current transmission is transmission of a new HARQ enabled downlink burst, the SS proceeds to step 415. In step 415, the SS confirms that the transmitted burst is a new HARQ enabled downlink burst and then checks information including the location, size, and sequence of the HARQ enabled downlink burst by analyzing the DL-MAP IE.

In step 417, the SS receives the HARQ enabled downlink burst forwarded to the SS itself in a downlink data region. In steps 419 and 421, the SS determines if the received HARQ enabled downlink burst has an error. Here, in determining if the received HARQ enabled downlink burst has an error, a Cyclic Redundancy Check (CRC) scheme is utilized. The CRC scheme uses cyclic binary codes in order to detect errors during usual data transmission. According to the CRC scheme, the determination of a transmission error is based on whether, when a transmitter-side has divided data into blocks and then transmitted the blocks together with a cyclic code attached after each block, which is obtained through a special calculation using a binary polynomial, a receiver-side obtains the same cyclic code by the same calculation method.

When the continuation field has a value of '1', that is, when the current transmission is retransmission of an already transmitted HARQ enabled downlink burst, the SS proceeds to step 431. In step 431, the SS confirms that current transmission is retransmission of an already transmitted HARQ enabled downlink burst and then prepares the IR scheme. In step 433, the SS confirms the location, size, and sequence of the HARQ enabled downlink burst by analyzing the DL-MAP IE and then proceeds to step 435.

In step 435, the SS receives the HARQ enabled downlink burst targeting the SS and applies the IR scheme by combining the already received sub-packet and the HARQ enabled downlink burst.

In steps 419 and 421, the SS determines if the received HARQ enabled downlink burst has an error. When the received HARQ enabled downlink burst has no error, the SS proceeds to step 423. In step 423, the SS prepares an ACK message by coding ACK information in accordance with the received HARQ enabled downlink burst.

When the received HARQ enabled downlink burst has an error, the SS proceeds to step 451. In step 451, the SS prepares a NACK message by coding NACK information in accordance with the HARQ enabled downlink burst error.

Finally, in step 425, the SS transmits the message (prepared through the ACK/NACK coding in step 423 or 451) through a sub-channel (ACK-CH) allocated to the SS in an uplink UCC region of the corresponding frame or a frame one or two frame-delayed after the corresponding frame.

Figure 5:
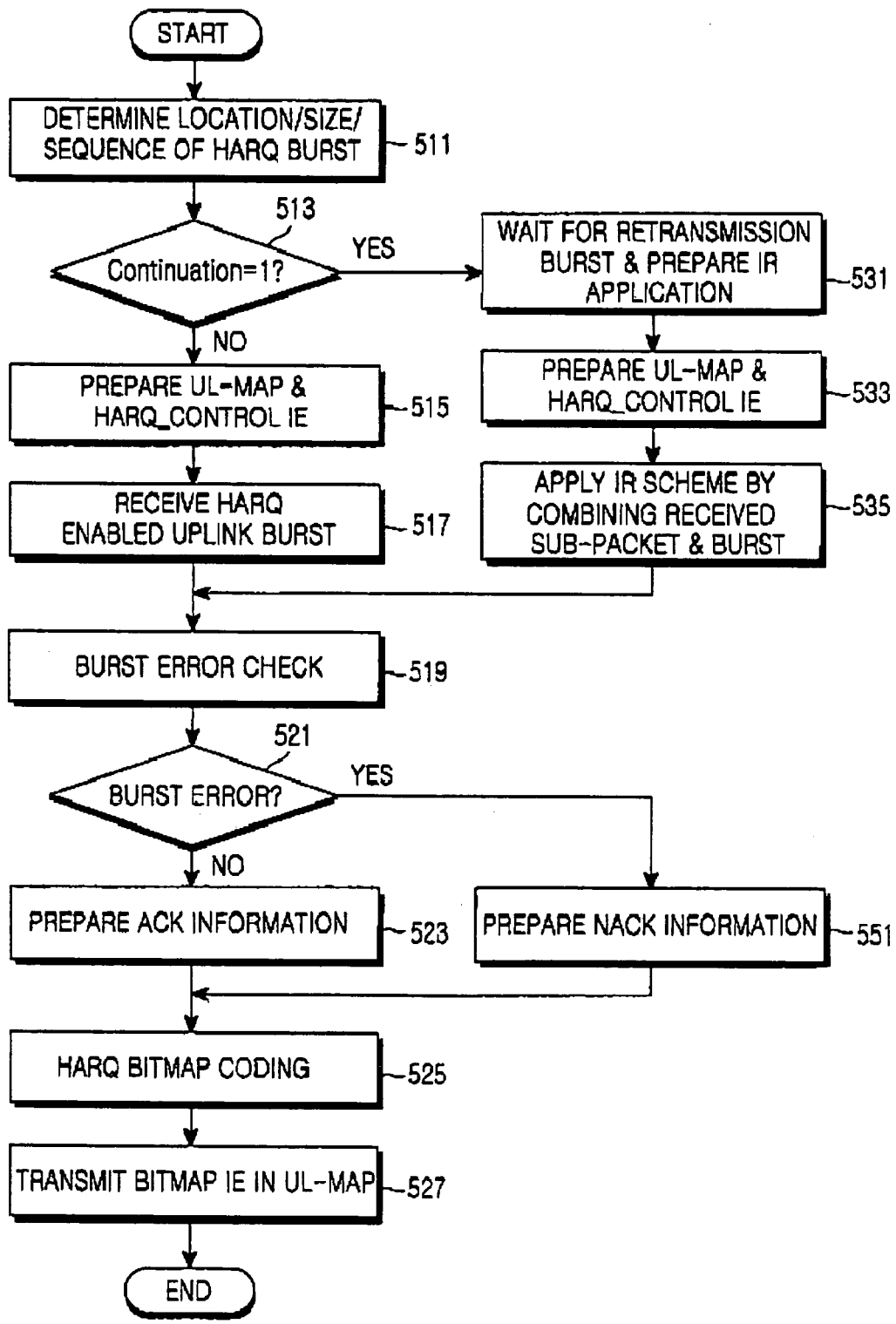
FIG. 5 is a flowchart of a process for operation of uplink HARQ in a HARQ ACK/NACK operation method according to the present invention.

FIG. 5 is a flowchart illustrating a process for operation of an uplink HARQ in a HARQ ACK/NACK operation method according to the present invention. More specifically, FIG. 5 illustrates an operation of a BS for the uplink in a process of operating the HARQ ACK/NACK.

Referring to FIG. 5, the BS determines the location, size, and sequence of the bursts of the SSs in step 511 and then checks the value of the continuation field in step 513.

When the continuation field has a value of '0', the BS confirms that current transmission is transmission of a new HARQ enabled uplink burst and then prepares a UL-MAP to be transmitted to the SS and a corresponding HARQ_Control IE in step 515. Thereafter, the BS receives the HARQ enabled uplink burst of the SS in step 517 and checks whether the received HARQ enabled uplink burst has an error in steps 519 and 521.

When the received HARQ enabled uplink burst has no error the BS prepares the ACK information in step 523. However, when the received HARQ enabled uplink burst has an error the BS prepares the NACK information in step 551. Thereafter, the BS prepares a bitmap to carry the prepared ACK/NACK message through the UL-MAP in step 525 and transmits the bitmap through the UL-MAP in step 527.

When the continuation field has a value of '1', the BS confirms that current transmission is retransmission of an already transmitted HARQ enabled uplink burst and then prepares an IR scheme in step 531. Thereafter, the BS prepares the UL-MAP to be transmitted to the SS and prepares a corresponding HARQ_Control IE in step 533. The BS receives the burst targeting the BS and applies the IR scheme by combining the already received sub-packet and the burst in step 535.

Hereinafter, an operation of the BS for the downlink in the HARQ ACK/NACK operation process of the TDD-OFDMA communication system having the above-described construction will be given.

In step 511, the BS determines SSs to which the BS will transmit the HARQ enabled uplink bursts through a corresponding uplink frame and then determines the location, size, and sequence of the bursts of the SSs. In step 513, the BS checks the value of the continuation field, thereby determining if the HARQ enabled uplink burst to be received is a retransmitted HARQ enabled uplink burst. The continuation field (shown in Table 4) is used for determining if the current transmission is transmission of a new HARQ enabled uplink burst or retransmission of an already transmitted HARQ enabled uplink burst, and is used to detect an error in the ACK/NACK transmission of the HARQ scheme, thereby improving the reliability.

When the continuation field has a value of '0', that is, when the current transmission is transmission of a new HARQ enabled uplink burst, the BS proceeds to step 515. In step 515, the BS prepares a UL-MAP to be transmitted to the SS and a corresponding HARQ_Control IE. In step 517, the BS receives the HARQ enabled uplink burst targeting the BS in the uplink data region. In steps 519 and 521 the BS determines if the received HARQ enabled uplink burst has an error. Here, in determining if the received HARQ enabled uplink burst has an error, the BS uses the CRC scheme as described above with reference to FIG. 4.

When the continuation field has a value of '1', that is, when the current transmission is retransmission of an already transmitted HARQ enabled uplink burst, the BS proceeds to step 531. In step 531, the BS confirms that current transmission is a retransmission of an already transmitted HARQ enabled uplink burst and then prepares an IR scheme. In step 533, the BS prepares the UL-MAP to be transmitted to the SS and prepares a corresponding HARQ_Control IE.

In step 535, the BS receives the burst targeting the BS in the uplink data region and applies the IR scheme by combining the already received sub-packet and the burst.

In steps 519 and 521, the BS determines if the received HARQ enabled uplink burst has an error. When the received HARQ enabled uplink burst has no error, the BS proceeds to step 523. In step 523, the BS prepares an ACK message corresponding to the received HARQ enabled uplink burst.

When the received HARQ has an error, the BS proceeds to step 551. In step 551, the BS prepares a NACK message corresponding to the HARQ enabled uplink burst error.

Thereafter, in step 525, the BS prepares a bitmap, which includes the ACK/NACK information prepared in step 523 or step 551 and will be transmitted through a UL-MAP of the next frame or a after frame one or two frame-delayed. Finally, in step 527, the BS transmits the bitmap through the UL-MAP of the corresponding frame.

According to a method for operating an HARQ scheme in a broadband wireless access communication system of the present invention, the ACK/NACK information is transferred by a bitmap. As a result, the size of the control data can be reduced in a high speed data transmission system such as the TDD-OFDMA communication system.

Further, the reduction above can increase the proportion of the actual data traffic in the entire traffic, thereby improving the transmission efficiency.

Moreover, the present invention proposes an method for efficient use of the HARQ scheme in order to increase the transmission efficiency in uplink/downlink high speed data transmission. The proposed method achieves rapid and exact control of the ACK/NACK information, thereby achieving exact transmission and reception of only the necessary information together with reduction of the MAP message.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method supporting a Hybrid Automatic Repeat Request (HARQ) between a subscriber station and a base station in a broadband wireless access communication system including, the method comprising the steps of:
    transmitting at least one HARQ enabled uplink burst from the subscriber station to the base station;
    generating ACKnowlegment/Negative ACKnowlegment (ACK/NACK) information according to the received at least one HARQ enabled uplink burst at the base station;
    mapping the generated ACK/NACK information to a bitmap at the base station; and
    transmitting the bitmap through a downlink information from the base station to the subscriber station.

2. The method as claimed in claim 1, wherein a bit position in the bitmap is determined by an order of HARQ enabled uplink bursts.

3. The method as claimed in claim 1, wherein the broadband wireless access communication system is a TDD (Time Division Duplex)-OFDMA (Orthogonal Frequency Division Multiple Access) system.

4. The method as claimed in claim 1, wherein a size of the bit map is variable according to a number of HARQ enabled uplink bursts.

5. The method as claimed in claim 1, wherein the downlink information is a downlink broadcasting message.

6. A method supporting a Hybrid Automatic Repeat Request (HARQ) between a subscriber station and a base station in a broadband wireless access communication system including, the method comprising the steps of:
    generating a downlink information indicating a HARQ ACKnowledgment (ACK) region and at least one HARQ enabled downlink burst at the base station;
    transmitting the downlink information from the base station to the subscriber station;
    generating ACK/NACK information according to the received HARQ enabled downlink burst at the subscriber station; and
    transmitting the generated ACK/NACK information through the H-ARQ ACK region from the subscriber station to the base station.

7. The method as claimed in claim 6, wherein the downlink information is a downlink broadcasting message.

8. The method as claimed in claim 6, wherein the HARQ ACK region is a HARQ ACK channel.

9. The method as claimed in claim 6, wherein the broadband wireless access communication system is a TDD (Time Division Duplex)-OFDMA (Orthogonal Frequency Division Multiple Access) system.

10. A method for operating a Hybrid Automatic Repeat Request (HARQ) scheme for a downlink by a subscriber station in a broadband wireless access communication system including the subscriber station and a base station, the method comprising the steps of:
    determining a type of HARQ enabled downlink burst being transmitted by analyzing an information element corresponding to a connection identifier of the subscriber station, after receiving a downlink Mobile Application Part (MAP) message belonging to a corresponding frame;
    when the HARQ enabled downlink burst being transmitted is a new burst, confirming transmission of the new burst and information of the HARQ enabled downlink burst, and receiving the HARQ enabled downlink burst in a downlink data region;
    when the HARQ enabled downlink burst being transmitted is a retransmitted burst, confirming retransmission of an already transmitted burst and information of the HARQ enabled downlink burst, and receiving the HARQ enabled downlink burst in a downlink data region;
    determining if the received HARQ enabled downlink burst has an error; and
    transmitting one of an ACKnowledgement (ACK) message and a Negative ACKnowledgement (NACK) message through a sub-channel in accordance with the determining for the error.

11. The method as claimed in claim 10, wherein, when the HARQ enabled downlink burst being transmitted is the retransmitted burst, the method further comprises the steps of:
    preparing an Incremental Redundancy (IR) scheme;
    confirming the information of the HARQ enabled downlink burst by analyzing the downlink MAP information element;
    receiving the HARQ enabled downlink burst in the downlink data region; and
    applying the IR scheme by combining an already received sub-packet and the HARQ enabled downlink burst.

12. The method as claimed in claim 10, wherein the downlink MAP message includes information about a location and a size of the HARQ enabled downlink burst in a predetermined frame, the HARQ enabled downlink burst being a downlink burst transmitted from the base station to the subscriber station.

13. The method as claimed in claim 10, wherein, the step of determining the type of HARQ enabled downlink burst being transmitted is performed by confirming a value of a continuation field included in the information element.

14. The method as claimed in claim 10, wherein the step of transmitting one of the ACK message and the NACK message comprises the steps of:
when the received HARQ enabled downlink burst has no error, transmitting the ACK message through a sub-channel allocated to the subscriber station, the ACK message being obtained by coding ACK information; and
when the received HARQ enabled downlink burst has an error, transmitting the NACK message through the sub-channel allocated to the subscriber station, the NACK message being obtained by coding NACK information.

15. The method as claimed in claim 10, wherein the one of the ACK message and the NACK message is transmitted through a sub-channel allocated to the subscriber station in an uplink control channel region of a corresponding frame.

16. The method as claimed in claim 10, wherein the one of the ACK message and the NACK message is transmitted through a sub-channel allocated to the subscriber station in an uplink control channel region of a frame after a corresponding frame.

17. The method as claimed in claim 10, wherein, in transmitting the one of the ACK message and the NACK message, a number of HARQ enabled downlink bursts are counted, a location of the HARQ enabled downlink burst is determined, a HARQ ACK channel is appointed in an uplink control channel region, and one of ACK information and NACK information is then transmitted through the HARQ ACK channel.

18. The method as claimed in claim 10, wherein the HARQ enabled downlink burst and one of ACK information and NACK information for the HARQ enabled downlink burst are transmitted through a HARQ ACK channel at a same position in the downlink data region.

19. The method as claimed in claim 10, wherein the sub-channel is an ACK channel.

20. A method for operating a Hybrid Automatic Repeat Request (HARQ) scheme for an uplink by a base station in a broadband wireless access communication system, the method comprising the steps of:
determining at least one subscriber station to which a base station will transmit a HARQ enabled burst through a corresponding uplink frame;
determining information of the HARQ enabled burst of the at least one subscriber station;
determining a type of the HARQ enabled burst by analyzing an information element corresponding to the determined subscriber station;
when the HARQ enabled burst being transmitted is a new burst, preparing an uplink Mobile Application Part (MAP) message to be transmitted to the subscriber station, preparing an information element corresponding to the uplink MAP message, and receiving the HARQ enabled burst targeting the base station in an uplink data region;
when the HARQ enabled burst being transmitted is a retransmitted burst, preparing an Incremental Redundancy (IR) scheme, preparing the uplink MAP message to be transmitted to the subscriber station, preparing an information element corresponding to the uplink MAP message, and receiving the HARQ enabled burst targeting the base station in the uplink data region;
determining if the received HARQ enabled burst has an error;
preparing one of an ACKnowledgment (ACK) message and a Negative ACKnowledgement (NACK) message in a form of bitmap, in accordance with a result of the determining; and
transmitting the one of the ACK message and the NACK message.

21. The method as claimed in claim 20, wherein, when the HARQ enabled burst being transmitted is the retransmitted burst, the method further comprises the steps of:
confirming retransmission of an already transmitted burst and preparing an Incremental Redundancy (IR) scheme;
preparing an uplink MAP message to be transmitted to the subscriber station and preparing an information element corresponding to the uplink MAP message;
receiving the HARQ enabled burst targeting the base station itself in the uplink data region; and
applying the IR scheme by combining an already received sub-packet and the HARQ enabled burst.

22. The method as claimed in claim 20, wherein the uplink MAP message in a corresponding frame includes information about a location and a size of the HARQ enabled burst in the corresponding frame, the HARQ enabled burst being an uplink burst transmitted from the subscriber station to the base station.

23. The method as claimed in claim 20, wherein the uplink MAP message appoints a channel in the uplink control channel region, such that one of ACK information and NACK information for the HARQ enabled burst from the base station to the subscriber station can be transmitted through the channel by at least the corresponding frame.

24. The method as claimed in claim 23, wherein, in appointing the channel through which the one of the ACK information and the NACK information can be transmitted, a number of uplink HARQ enabled bursts are counted, a location of the HARQ enabled burst is determined, one bit is appointed in the bitmap of the uplink MAP message, and the one of the ACK information and the NACK information is then transmitted by said one bit.

25. The method as claimed in claim 20, wherein, the step of determining the type of the HARQ enabled burst being transmitted is performed by confirming a value of a continuation field included in the information element.

26. The method as claimed in claim 20, wherein the step of transmitting the one of the ACK message and the NACK message comprises the steps of:
when the received HARQ enabled burst has no error, preparing ACK information, performing HARQ bitmap coding for the prepared ACK information, and transmitting the coded ACK information in a form of a bitmap through the uplink MAP message in the corresponding frame; and
when the received HARQ enabled burst has an error, preparing NACK information, performing HARQ bitmap coding for the prepared NACK information, and transmitting the coded NACK information in a form of a bitmap through the uplink MAP message in the corresponding frame.

27. The method as claimed in claim 20, wherein the one of the ACK message and the NACK message is transmitted in a form of a bitmap through an uplink MAP message of a frame after the corresponding frame.

28. The method as claimed in claim 20, wherein the HARQ enabled burst and one of ACK information and NACK information for the HARQ enabled burst are transmitted through a HARQ ACK channel at a same position in the uplink data region.

29. The method as claimed in claim 20, wherein one of ACK information and NACK information for the HARQ enabled burst transmitted from the subscriber station to the base station is expressed in a form of a bitmap in an uplink MAP message broadcasted from the base station to the subscriber station at a frame after the corresponding frame.

30. The method as claimed in claim 20, wherein the bitmap includes a field representing a fixed length and a field representing a variable length of a transmitted bitmap.

* * * * *